US012675348B2

(12) United States Patent
Tang

(10) Patent No.: US 12,675,348 B2
(45) Date of Patent: Jul. 7, 2026

(54) PROCESSING EXCEPTION IN ANDROID THREAD

(71) Applicant: HUIZHOU TCL MOBILE COMMUNICATION CO., LTD., Huizhou (CN)

(72) Inventor: Dongjiao Tang, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 461 days.

(21) Appl. No.: 18/335,146

(22) Filed: Jun. 15, 2023

(65) Prior Publication Data

US 2023/0325187 A1 Oct. 12, 2023

Related U.S. Application Data

(63) Continuation of application No. PCT/CN2021/075595, filed on Feb. 5, 2021.

(30) Foreign Application Priority Data

Dec. 18, 2020 (CN) .......................... 202011508843.4

(51) Int. Cl.
*G06F 9/54* (2006.01)
*G06F 9/48* (2006.01)

(52) U.S. Cl.
CPC ............ G06F 9/546 (2013.01); G06F 9/4812 (2013.01); *G06F 2209/481* (2013.01)

(58) Field of Classification Search
None
See application file for complete search history.

(56) References Cited

U.S. PATENT DOCUMENTS

2012/0173855 A1 * 7/2012 Holler .................. G06F 9/4843
712/E9.06
2017/0153962 A1 6/2017 Biegun

FOREIGN PATENT DOCUMENTS

| CN | 106708643 | A | | 5/2017 | | |
|----|-----------|---|---|--------|---|---|
| CN | 106959909 | A | | 7/2017 | | |
| CN | 107391295 | A | | 11/2017 | | |
| CN | 107517188 | A | * | 12/2017 | ............. | H04L 67/60 |
| CN | 108052406 | A | * | 5/2018 | ......... | G06F 11/0766 |
| CN | 110175101 | A | | 8/2019 | | |
| CN | 111290872 | A | | 6/2020 | | |
| CN | 111708655 | A | | 9/2020 | | |
| WO | WO-2011094484 | A1 | * | 8/2011 | ........... | G06F 11/008 |

(Continued)

OTHER PUBLICATIONS

International Search Report in International application No. PCT/CN2021/075595, mailed on Sep. 26, 2021.

(Continued)

*Primary Examiner* — Charles E Anya
(74) *Attorney, Agent, or Firm* — PV IP PC; Wei Te Chung

(57) ABSTRACT

The present application provides a method for processing an exception in an Android thread, a terminal, and a computer readable storage medium. The method includes: in response to the exception occurring in a sub-thread, calling a custom handler to process the exception; and in response to the exception occurring in a main thread, restarting a message loop of a looper after the message loop is stop, and capturing the exception in the main thread.

17 Claims, 2 Drawing Sheets

(56) References Cited

FOREIGN PATENT DOCUMENTS

WO     WO-2014130548 A1 *  8/2014   .......... G06F 11/3612
WO     WO-2019191742 A1 *  10/2019   ........... G06F 15/867

OTHER PUBLICATIONS

Written Opinion of the International Search Authority in International application No. PCT/CN2021/075595,mailed on Sep. 26, 2021.
Chinese Office Action issued in corresponding Chinese Patent Application No. 202011508843.4 dated Aug. 2, 2022, pp. 1-10.

* cited by examiner

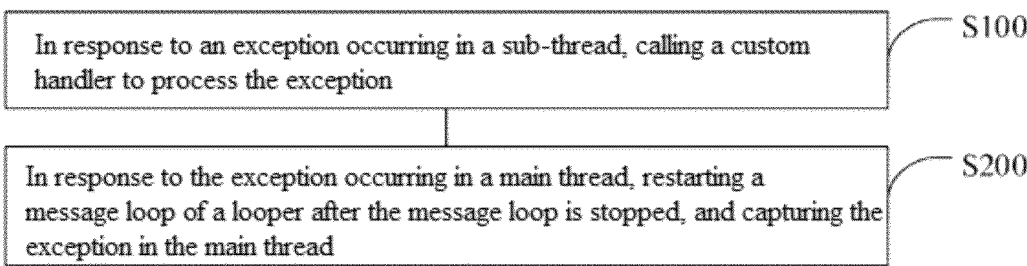

In response to an exception occurring in a sub-thread, calling a custom handler to process the exception — S100

In response to the exception occurring in a main thread, restarting a message loop of a looper after the message loop is stopped, and capturing the exception in the main thread — S200

FIG. 1

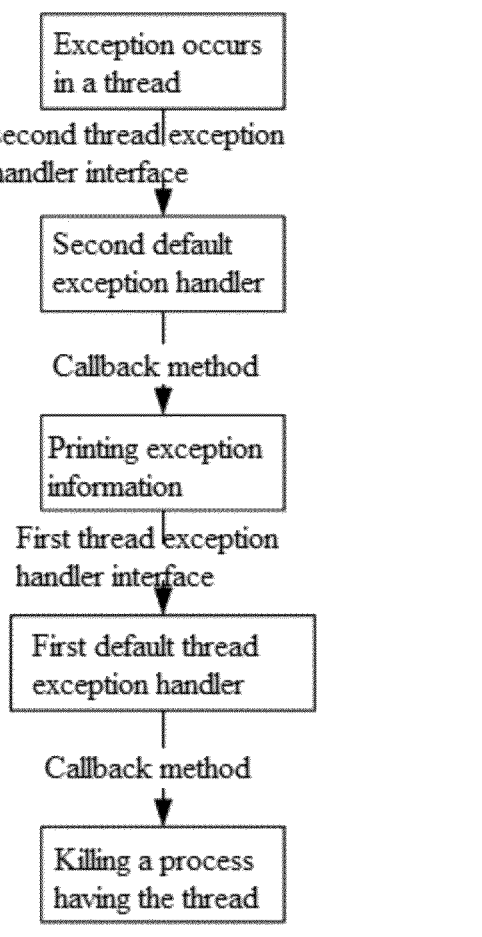

Exception occurs in a thread second thread exception handler interface

Second default exception handler

Callback method

Printing exception information

First thread exception handler interface

First default thread exception handler

Callback method

Killing a process having the thread

FIG. 2

PROCESSING EXCEPTION IN ANDROID THREAD

CROSS-REFERENCE TO RELATED APPLICATIONS

This application is a continuation of International Application No. PCT/CN2021/075595, filed on Feb. 5, 2021, which claims priority to and the benefit of Chinese Patent Application No. 202011508843.4, filed on Dec. 18, 2020. The disclosures of the aforementioned applications are incorporated herein by reference in their entireties.

TECHNICAL FIELD

The present application relates to the field of Android technologies, and more particularly, to a method for processing an exception in an Android thread, a terminal, and a computer readable storage medium.

BACKGROUND

More and more applications may have been installed on a smart terminal. If an exception occurs in a thread of an application during executing the application, a process in which the thread is located may crash, which causes the application to be exited directly, resulting in a worse user experience.

Therefore, an improvement and a development of the related art may be required.

SUMMARY

In a first aspect of the present application, a method for processing an exception in an Android thread may be provided, including: in response to the exception occurring in a sub-thread, calling a custom handler to process the exception; and in response to the exception occurring in a main thread, restarting a message loop of a looper after the message loop is stopped, and capturing the exception in the main thread.

In a second aspect of the present application, a device for processing an exception in an Android thread may be provided, including: a sub-thread exception processing module for, in response to an exception occurring in a sub-thread, calling a custom handler to process the exception; and a main thread exception processing module for, in response to an exception occurring in a main thread, restarting a message loop of a looper after the message loop is stop, and capturing the exception in the main thread.

In a third aspect of the present application, a terminal may be provided, including a processor and a computer readable storage medium communicatively connected to the processor, where the computer readable storage medium may be adapted to store a plurality of instructions, and the processor may be adapted to call the instructions in the computer readable storage medium to perform steps of implementing the method for processing the exception in the Android thread as described above.

In a fourth aspect of the present application, a computer readable storage medium may be provided, having stored thereon one or more programs that, when executed by one or more processors, implement steps of the method for processing the exception in the Android thread as described above.

BRIEF DESCRIPTION OF THE DRAWINGS

FIG. 1 is a flowchart of a method for processing an exception in an android thread according to an embodiment of the present application.

FIG. 2 is a flowchart of processing an exception in an android thread in the related art.

DETAILED DESCRIPTION

Figure 3:
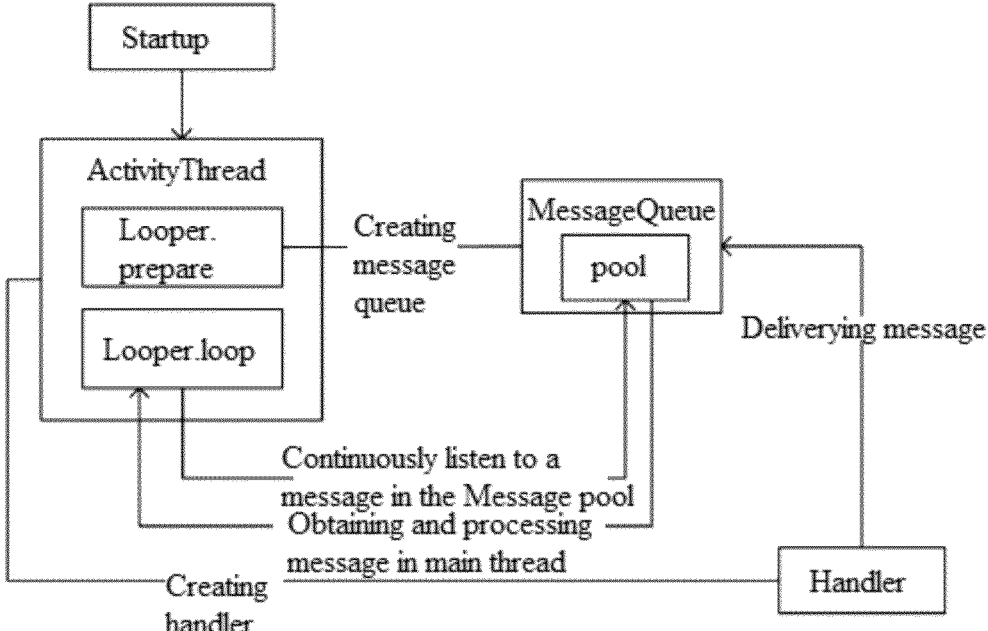
FIG. 3 is a schematic diagram of a main thread message processing mechanism in a method for processing an exception in an android thread according to an embodiment of the present application.

To make the objectives, technical solutions, and effects of the present application more clear and definite, the present application is illustrated in detail below by referring to the accompanying drawings and illustrating the embodiments. It should be understood that the specific embodiments described here are only used to explain the present application, and are not used to limit the present application.

A method for processing an exception in an android thread provided in an embodiment of the present application may be applied to a terminal on which an Android system may be run.

FIG. 1 is a flowchart of a method for processing an exception in an android thread according to an embodiment of the present application. The method for processing the exception in the Android thread may include step S100.

At step S100, a custom handler may be called to process an exception in response to the exception occurring in a sub-thread.

Inventors have found that the Android system provides a default handler (Handler) for handling an exception in a thread. When an exception has occurred in a thread, the exception may be processed by the default handler. Specifically, the Android system registers two handlers, i.e., a second default thread exception handler (LoggingHandler) and a first default thread exception handler (KillApplicationHandler), with all threads on its startup. The two handlers are default processors that may be configured to process an exception when the exception has occurred in a thread of the Android system. Specifically, the Android system provides a class of RuntimeInit for detecting an application in operation. The RuntimeInit may call a function of commonInit on its startup to register the first default thread exception handler and the second default thread exception handler. When an exception has occurred in a sub-thread, the Android system calls the two thread exception handlers for processing the exception by default. As shown in FIG. 2, when an exception has occurred in a sub-thread, the second default thread exception handler (LoggingHandler) may be called via a second thread exception handler interface (getuncaughtExceptionPreHandler). After exception information of the sub-thread is printed by a callback method (uncaught Exception) of the Logging-Handler, the first default thread exception handler (KillApplicationHandler) is called by a first thread exception handler interface (getDefaultUncaughtExceptionHandler). A callback method (uncaught Exception) of the first default thread exception handler may kill a process in which the sub-thread is located with a kill process (killProcess). In such a processing mode, after the exception occurs in the sub-thread, the sub-thread itself may be stopped running due to the exception, and a process in which the sub-thread is located is forced to be stopped, which causes the process to crash. In fact, a large number of sub-threads may be configured to perform insignificant operations and do not affect the overall process. In the present embodiment, when the exception has occurred in the sub-thread, the first default thread exception handler of the Android system is not called for processing the exception, but a custom handler may be called for processing the exception. The logic in the callback method of the custom handler can be defined by itself, and the kill process may be not executed, so that the entire process in which the sub-thread is located may be not killed after the exception occurs in the sub-thread.

Specifically, the method for processing the exception in the Android thread according to the present embodiment may include: before the calling of the custom handler for processing the exception, creating the custom handler to define a callback method of the custom handler; and overlaying a first default thread exception handler of the Android system by using the custom handler.

In the callback method (uncaughtException) of the custom handler, a process where the thread in which the exception occurs is located may be not terminated. As such, when the custom handler may be called to process the exception in the sub-thread, the process in which the sub-thread is located may be not terminated. For example, the callback method of the custom handler may be defined to upload exception information to a server. That is, the calling of the custom handler to process the exception may include calling the custom handler to upload exception information of the sub-thread to a server.

Of course, it may be understood by those skilled in the art that the callback method of the custom handler may also be defined to implement other operations. Specific codes of the callback method of the custom handler may be as follows.

```
class MyCarshHandler implements Thread.UncaughtExceptionHandler{
        @Override
        public void uncaughtException(@NonNull Thread t,
@NonNull Throwable e)
{
            //upload exception information
        }
    }
}
```

After the custom handler is created, the first default thread exception handler of the Android system may be overlaid by the custom handler. The thread may be forced to go to the custom handler for processing the exception after the exception occurs. The first default thread exception handler, such as KillApplicationHandler described above, may be configured to terminate the process in which the thread where the exception has occurred is located. Codes for loading the custom handler to overlay the first default thread exception handler of the Android system may be as follows Thread.setDefaultUncaughtExceptionHandler(new
MyCarshHandler( ));

As can be seen from the above description that, since the first default thread exception handler is overlaid and the callback method of the custom handler does not terminate a process where the thread in which an exception occurs is located, the process where the sub-thread is located is not terminated, and the application only loses the sub-thread and does not crash, thereby improving the user experience.

The method for processing the exception in the Android thread may include: before calling the custom handler to upload exception information of the sub-thread to the server, printing exception information of the sub-thread.

Specifically, in the present embodiment, only the default thread exception handler for terminating the process where the thread in which the exception occurs is located in the Android system may be overlaid, and the second default thread exception handler for printing exception information of the thread, i.e., the LoggingHandler described above, may be still reserved. The printing of the exception information of the sub-thread may specifically include calling a second default sub-thread exception handler of the Android system to print exception information of the sub-thread.

Referring again to FIG. 1, the method for processing the exception in the Android thread according to the present embodiment may further include step S200.

At step S200, in response to an exception occurring in a main thread, a message loop of a looper may be restarted after the message loop is stopped, and the exception may be captured in the main thread.

As shown in FIG. 3, the Android system may be implemented by driving a set of message. Startup of an application, refresh of User Interface (UI), and an input event may be processed in a main thread in the form of a message. The main thread may include a looper (Looper), a handler (Handler), and a message queue (MessageQueue). After the application is started, a looper preparation module (Looper.prepare) may create a message queue and a handler. The handler may transmit various messages, such as startup of an application, refresh of UI, and the like, to the message queue. A pool of messages (Message pool) may be inside the message queue, and a looper looping module (Looper.loop) can perform a message loop and continuously listen whether a message exists in the Message pool of the message queue during the message loop. If the message exists in the Message pool, a next method of the message queue may be continuously called to obtain a message, and then transmit the message to the main thread for processing the message. In the related art, if an exception occurs in the main thread, the exception may be thrown, and a message loop may be stopped. That is, the looper looping module stops obtaining a message from the message queue, and the entire process may be skilled after the exception is thrown in the main thread, resulting in exiting the application directly.

In the present embodiment, in response to an exception occurring in a main thread, a message loop of a looper may be restarted after the message loop is stopped, and the exception may be captured in the main thread, so that the main thread does not crash. Specifically, the restarting and the capturing may be implemented by a loop module starting loop. That is, the restarting and the capturing may include triggering a loop module starting loop after the message loop of the looper is stopped, and starting the message loop of the looper and capturing the exception in the main thread in the loop module starting loop.

After the message loop of the looper is started, the loop module of the looper may listen to a new message in the message queue and obtain the message in the message queue. After the loop module starting loop is triggered, the exception information of the main thread may be printed and processed while the exception in the main thread is captured in the loop module starting loop. For example, the exception information in the main thread can be uploaded to the server.

In the present embodiment, the establishing of a loop module starting loop may be implemented. That is, the method may further include: before restarting the message loop of the looper after the message loop is stopped, establishing a loop module starting loop for restarting the loop module in the looper after the looper stops the message loop and capturing the exception in the main thread.

The loop module starting loop may be a while loop. Specifically, a loop establishing message Runnable may be delivered to the main thread by the handler of the main thread when the main thread is started, and the loop module starting loop may be established when the main thread executes the loop establishing message, of which specific codes may be as follows.

```
new Handler(getMainLooper( )).post(new Runnable( ) {
    @Override
    public void run( ) {
        while (true){
            try {
                Looper.loop( );
            }catch (Exception e){
                //Processing exceptionlog
            }
        }
    }
});
```

It can be seen from the above description that, after the exception occurs in the main thread, the method for processing the exception in the Android thread provided in the present embodiment can call a pre-established loop starting loop to restart the loop module of the looper of the main thread so that the message processing mechanism of the main thread continues to normally proceed. The exception is captured in the main thread and cannot be thrown, so the main thread does not crash. The application can continue to work, and the main thread does not exit, thereby improving the user experience.

In summary, the present application provides the method for processing the exception in the Android thread. When the exception occurs in a sub-thread, a custom handler may be called without using a default exception handler of the Android. As such, a developer can implement logic in a callback method of the custom handler, so that a process in which the sub-thread is located is not killed by the default exception handler when the exception occurs in the sub-thread. When the exception occurs in the main thread, the present application can restart a message loop of a looper after the loop message is stopped and capture the exception of the main thread. The exception of the main thread cannot be thrown, and the message loop can be continued, so that the main thread can continue to work, and whether the exception occurs in the sub-thread or the main thread in the process, the process does not crash, thereby improving use experience of the user.

It should be understood that, although the steps in the flow chart given in the drawings of the present application are shown in sequence as indicated by arrows, these steps are not necessarily performed in sequence as indicated by the arrows. Unless expressly stated herein, the execution of the steps in the specification is not limited in strict order, and the steps may be executed in other orders. Further, at least a portion of the steps in the specification may include a plurality of sub-steps or a plurality of stages, which are not necessarily performed at the same time, but may be performed at different moments, the sub-steps or stages are not necessarily performed sequentially, but may be performed in turn or alternately with at least a portion of other steps, or the sub-steps or stages of other steps.

It should be understood by those of ordinary skill in the art that all or a portion of the flow of implementing the methods of the embodiments described above may be accomplished by a computer program instructing relevant hardware that may be stored in a computer-readable medium. The computer-readable medium include transitory computer-readable medium and non-transitory computer-readable storage medium. The transitory computer-readable medium includes carrier wave, transmission medium and the like. The non-transitory computer-readable storage medium, when executed, may include the flows of the method embodiments provided in the present application which may include non-volatile and/or volatile memory. The non-volatile memory may include read only memory (ROM), programmable ROM (PROM), electrically programmable ROM (EPROM), electrically erasable programmable ROM (EEPROM), or flash memory. The volatile memory may include random access memory (RAM) or external cache memory. By way of illustration and not limitation, the RAM may be available in a variety of forms such as static RAM (SRAM), dynamic RAM (DRAM), synchronous link (Synchlink) DRAM (SLDRAM), memory bus (Rambus) direct RAM (RAMDRAM), direct memory bus dynamic RAM (DRRAM), and memory bus dynamic RAM (RDRAM).

Based on the embodiments described above, a device for processing an exception in an Android thread may be further provided in another embodiment of the present application, including: a sub-thread exception processing module for, in response to an exception occurring in a sub-thread, calling a custom handler to process the exception, which is specifically described as shown in the above-described embodiments; and a main thread exception processing module for, in response to an exception occurring in a main thread, restarting a message loop of a looper after the message loop is stop, and capturing the exception in the main thread, which is specifically described as shown in the above-described embodiments.

Figure 4:
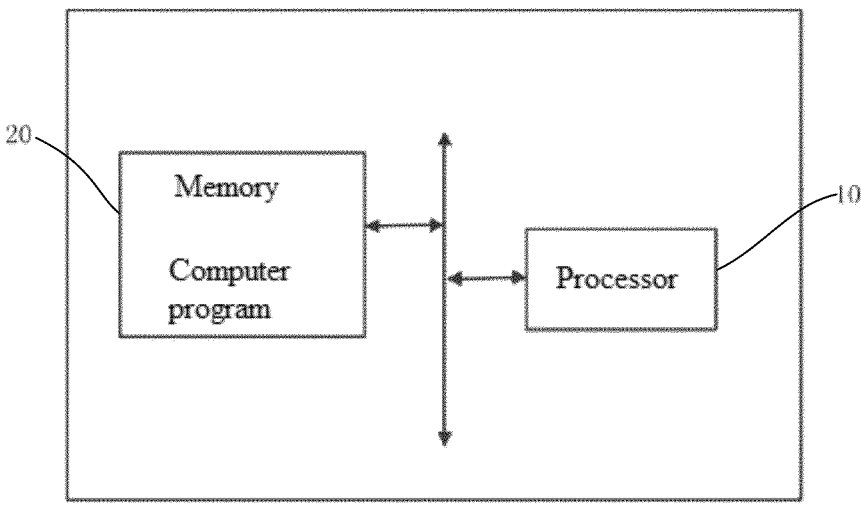
FIG. 4 is a schematic structural diagram of a terminal according to an embodiment of the present application.

Based on the embodiments described above, a terminal may be further provided in yet another embodiment of the present application, of which a schematic structural diagram can be shown in FIG. 4. The terminal may include a processor 10 and a memory 20, where the memory 20 may be configured to store a computer program, and the processor 10 may be configured to perform the computer program to implement at least following steps: in response to an exception occurring in a sub-thread, calling a custom handler to process the exception; and in response to an exception occurring in a main thread, restarting a message loop of a looper after the message loop is stopped, and capturing the exception in the main thread.

In some implementations, the calling of the custom handler may further include: creating the custom handler to define a callback method of the custom handler, where the callback method of the custom handler does not terminate a process in which a thread where an exception has occurred is located; and overlaying a first default thread exception handler of the Android system by using the custom handler; where the first default thread exception handler may be configured to terminate the process in which the thread where the exception has occurred is located.

In some implementations, the calling of the custom handler may further include: calling the custom handler to upload exception information of the sub-thread to a server.

In some implementations, the restarting and the capturing may include: triggering a loop module starting loop after the message loop of the looper is stopped, and starting the message loop of the looper and capturing the exception in the main thread in the loop module starting loop.

In some implementations, the triggering of the loop module starting loop may further include printing and processing the exception information of the main thread while the exception in the main thread is captured in the loop module starting loop.

In some implementations, the printing and processing of the exception information of the main thread may further include uploading the exception information of the main thread to the server.

In some implementations, the calling of the custom handler to upload the exception information of the sub-thread to the server may further include printing exception information of the sub-thread.

In some implementations, the printing of the exception information of the sub-thread may further include calling a second default sub-thread exception handler of the Android system to print exception information of the sub-thread.

In some implementations, the restarting of the message loop may further include establishing a loop module starting loop for restarting the loop module in the looper after the looper stops the message loop and capturing the exception in the main thread.

In some implementations, the establishing of the loop module starting loop may further include delivering a loop establishing message to the main thread to enable the main thread to establish the loop module starting loop when the main thread executes the loop establishing message.

In some implementations, the loop module starting loop may be a while loop.

A computer readable storage medium may be provided in another embodiment of the present application, having stored thereon one or more programs that, when executed by one or more processors, implement steps of the method for processing the exception in the Android thread as described above in the embodiments.

Finally, it should be noted that the aforesaid embodiments are only intended to explain but not to limit the technical solutions of the present application. Although the present application has been explained in detail with reference to the above-described embodiments, the person of ordinary skill in the art may understand that, the technical solutions described in each of the embodiments mentioned above may still be amended, or some technical features in the technical solutions may be replaced equivalently; these amendments or equivalent replacements, which doesn't cause the essence of the corresponding technical solution to be broken away from the spirit and the scope of the technical solution in various embodiments of the present application, should all be included in the protection scope of the present application.

What is claimed is:

1. A method for processing an exception in an Android thread, comprising:
in response to the exception occurring in a sub-thread, calling a custom handler to process the exception; and
in response to the exception occurring in a main thread, restarting a message loop of a looper after the message loop is stopped, and capturing the exception in the main thread;
wherein the calling of the custom handler comprises:
creating the custom handler to define a callback method of the custom handler, wherein the callback method of the custom handler does not terminate a process in which a thread having an exception is located; and
overlaying a first default thread exception handler of an Android system by using the custom handler;
wherein the first default thread exception handler is configured to terminate the process in which the thread having the exception is located.

2. The method of claim 1, wherein the calling of the custom handler further comprises:
calling the custom handler to upload exception information of the sub-thread to a server.

3. The method of claim 1, wherein the calling of the custom handler to upload the exception information of the sub-thread to the server comprises:
printing the exception information of the sub-thread.

4. The method of claim 3, wherein the printing of the exception information of the sub-thread comprises:
calling a second default sub-thread exception handler of an Android system to print the exception information of the sub-thread.

5. The method of claim 1, wherein the restarting and the capturing comprise:
triggering a loop module starting loop after the message loop of the looper is stopped, and starting the message loop of the looper and capturing the exception in the main thread in the loop module starting loop.

6. The method of claim 5, wherein the triggering of the loop module starting loop further comprises:
printing and processing the exception information of the main thread while the exception in the main thread is captured in the loop module starting loop.

7. The method of claim 6, wherein the printing and processing of the exception information of the main thread comprise:
uploading the exception information of the main thread to a server.

8. The method of claim 1, wherein the restarting of the message loop further comprises:
establishing a loop module starting loop for restarting the loop module in the looper after the looper stops the message loop and capturing the exception in the main thread.

9. The method of claim 8, wherein the establishing of the loop module starting loop comprises:
delivering a loop establishing message to the main thread to enable the main thread to establish the loop module starting loop while the main thread executes the loop establishing message.

10. The method of claim 5, wherein the loop module starting loop is a while loop.

11. A terminal comprising:
a processor and a computer readable storage medium communicatively connected to the processor, wherein the computer readable storage medium stores thereon instructions executable by the processor to perform operations comprising:
in response to an exception occurring in a sub-thread, calling a custom handler to process the exception; and
in response to an exception occurring in a main thread, restarting a message loop of a looper after the message loop is stopped, and capturing the exception in the main thread;
wherein the calling of the custom handler to upload the exception information of the sub-thread to the server comprises:
printing the exception information of the sub-thread; and
wherein the printing of the exception information of the sub-thread comprises:
calling a second default sub-thread exception handler of an Android system to print the exception information of the sub-thread.

12. The terminal of claim 11, wherein the calling of the custom handler comprises:

creating the custom handler to define a callback method of the custom handler, wherein the callback method of the custom handler does not terminate a process in which a thread having an exception is located; and overlaying a first default thread exception handler of an Android system by using the custom handler;

wherein the first default thread exception handler is configured to terminate the process in which the thread having the exception is located.

13. The terminal of claim 11, wherein the calling of the custom handler further comprises:

calling the custom handler to upload exception information of the sub-thread to a server.

14. The terminal of claim 11, wherein the restarting and the capturing comprise:

triggering a loop module starting loop after the message loop of the looper is stopped, and starting the message loop of the looper and capturing the exception in the main thread in the loop module starting loop.

15. The terminal of claim 14, wherein the triggering of the loop module starting loop further comprises:

printing and processing the exception information of the main thread while the exception in the main thread is captured in the loop module starting loop.

16. The terminal of claim 15, wherein the printing and processing of the exception information of the main thread comprise:

uploading the exception information of the main thread to a server.

17. A non-transitory computer-readable storage medium having stored thereon instructions executable by a processor to perform operations comprising:

in response to an exception occurring in a sub-thread, calling a custom handler to process the exception; and in response to an exception occurring in a main thread, restarting a message loop of a looper after the message loop is stopped, and capturing the exception in the main thread;

wherein the restarting and the capturing comprise:

triggering a loop module starting loop after the message loop of the looper is stopped, and starting the message loop of the looper and capturing the exception in the main thread in the loop module starting loop; and wherein the triggering of the loop module starting loop further comprises:

printing and processing the exception information of the main thread while the exception in the main thread is captured in the loop module starting loop.

* * * * *